United States Patent [19]

Kiss

[11] 3,886,809

[45] June 3, 1975

[54] POSITIVE DRIVE CONTINUOUS GEAR MESH SHIFTING TRANSMISSIONS

[76] Inventor: Laszlo J. Kiss, 7044 Paige, Warren, Mich. 48091

[22] Filed: Aug. 7, 1972

[21] Appl. No.: 278,377

[52] U.S. Cl. .................... 74/681; 74/339; 74/679; 74/335; 74/393
[51] Int. Cl. ... F16h 37/06; F16h 37/00; F16h 3/38; F16h 35/02
[58] Field of Search ............ 74/679, 681, 334, 335, 74/393

[56] References Cited
UNITED STATES PATENTS

| | | | |
|---|---|---|---|
| 2,593,416 | 4/1952 | Dawson | 74/339 |
| 2,740,509 | 3/1956 | Lecavelier | 74/335 X |
| 2,764,032 | 9/1956 | Leber | 74/339 |
| 3,306,128 | 2/1967 | Zuse | 74/679 |
| 3,327,637 | 6/1967 | Hotta | 74/393 |
| 3,659,479 | 5/1972 | Kiss | 74/681 |

Primary Examiner—Samuel Scott
Assistant Examiner—P. S. Lall

[57] ABSTRACT

A transmission having a primary drive system including a primary drive input, an input driven planetary ratio alternator system, and an input driven and position sensing automatic mechanical shifter system operable to shift a continuously driven ratio alternator output into driving engagement with the output of the primary drive system, vary its relative rotational value and then disengage, while simultaneously respectively disengaging and engaging the primary drive input and output, in automatic synchronous rotational and positional timed relation to the ratio alternator system functional cycles, with continuous positive gear mesh drive at all times, including during all shifting operations, to thereby vary the primary system driving ratios while maintaining continuous torque delivery throughout. Various novel applications of the basic system as well as different planetary ratio alternator modifications are also disclosed.

35 Claims, 17 Drawing Figures

Fig-5

POSITIVE DRIVE CONTINUOUS GEAR MESH SHIFTING TRANSMISSIONS

BACKGROUND OF THE INVENTION

I. Field of the Invention

My invention relates to transmission drive systems and the like and more particularly to basic systems having unique planetary ratio alternators and means to achieve shifting between selective drive system speed ratios while transmitting continuous torque at all times.

II. Description of the Prior Art

In my U.S. Pat. No. 3,468,177, issued Sept. 23, 1969, I describe my basic invention of a novel continuous gear-mesh shifting transmission system, the heart of which is a unique ratio alternator and a positive shifter system combination in which primary drive system gears are synchronously shifted between desired driving ratios with full width gear tooth mesh without involving any frictional elements such as clutches, brakes or the like. This basic patent discloses unique applications of the basic invention to various types of spur gear drive transmissions.

My U.S. Pat. No. 3,659,479, issued May 2, 1972, constitutes unique extensions of the principles of the basic invention to all types of planetary drive systems in which, basically, the reaction member of a planetary drive system is positively driven at selected primary drive rotational values to thereby determine the driving ratios of the planetary input and output members, and is synchronously shifted by an automatic mechanical shifter system into and out of engagement with the continuously alternately accelerating and decelerating output of a ratio alternator system, while being simultaneously shifted out of and into engagement with the primary drive system, to thereby accelerate or decelerate the primary drive between different output rotational values while maintaining constant driving gear mesh of the system at all times. The shifting operations are automatically actuated at predetermined synchronous functional positions of the ratio alternator system operating cycles, resulting in positive drive continuously constant gear-mesh speed change of the planetary system, with positive changes of input to output ratios, shifting with no loss or interruption of torque, and without using any frictional clutches, brakes or the like.

The planetary reaction member is thus selectively positively shifted and synchronously engaged with either a primary system fixed member, a primary system drive gear, or directly with the planetary input member itself for direct drive, and maintained at that primary drive rotational value to effect a constant selected planetary input-to-output driving ratio. Alternatively, the reaction member may be completely synchronously disengaged to effect a neutral condition in which no driving force is transmitted to the output member. Further, the reaction member may be shifted to and maintained at a primary drive rotational value which is the same as its neutral rotational value, which will effect a positively driven stopped or zero rotational condition of the output member, or it may be shifted to and maintained at a primary drive rotational value which produces an output speed intermediate its fixed low speed and direct drive, or between its fixed low speed and zero output speed.

SUMMARY OF THE INVENTION

One valuable embodiment of the basic invention above described is a geared positive clutch incorporating a planetary ratio alternator. Also, important aspects of the invention are the planetary ratio alternators themselves, which embody unique functional characteristics for changing primary drive ratios, with positive drive shifting accomplished through the automatic mechanical shifter systems combined therewith.

In the present invention, a two-stage planetary ratio alternator system incorporates a first ratio alternator which continuously drives the planetary reaction member to produce planetary output member rotation continuously alternating between selected minimum and maximum values which are synchronous with selected output rotational values of a primary drive system whose input also drives the first ratio alternator stage as well as the planetary input member. A simplified positive automatic mechanical shifter system, driven from the same primary drive system input, shifts the ratio alternator output and the primary drive system elements synchronously into and out of engagement in positive unvaryingly timed relation.

With my present invention all shifting is accomplished through the use of this unique automatic mechanical shifter system having preset shifting functions related to the functions of the ratio alternator system such that the shiftings are effected with a constant mechanical shifting cycle related to predetermined constant input shaft revolutions to produce constant relative output revolutions while shifting to and from selected drive ratios. Whenever mechanical shifting cycles are repeated, they will always be absolutely the same in revolutions and also in input relative "shift time". Therefore, the drive systems incorporating my present invention are applicable to even the most demanding shift accuracy requirements of automatic or semi-automatic drive systems. Shifting controls may be manual or semi-automatic, or may incorporate fully-automatic punched card or magnetic tape controls, or the like.

Thus, a great many desired drive results are possible with a drive system incorporating the present invention, in all cases providing for continuous torque delivery even during the shifting operations, with accurate shifting cycles, producing useful applications for innumerable types of industrial machinery and vehicles as well as in heavy duty applications where speed changing is desired with or without positive stops.

For a more complete understanding of the present invention, reference may be had to the accompanying drawings illustrating some preferred embodiments of the invention in which like reference characters refer to like parts throughout the several views and in which:

FIGS. 1D-1, 1D-2 and 1D-3 are diagrammatic representations illustrating further shift functions of the elements of FIG. 1D.

DESCRIPTION OF THE PREFERRED EMBODIMENTS

FIG. 1 and FIGS. 1A through 1F inclusive illustrate in detail a preferred modification of the present geared positive clutch system in which a main housing 10 supports bearing assemblies 12 and 14 for rotatably carrying a primary input shaft 16 adapted to be driven by a motor (not shown) connected by any desired means to the left end of the shaft 16.

Figure 1:
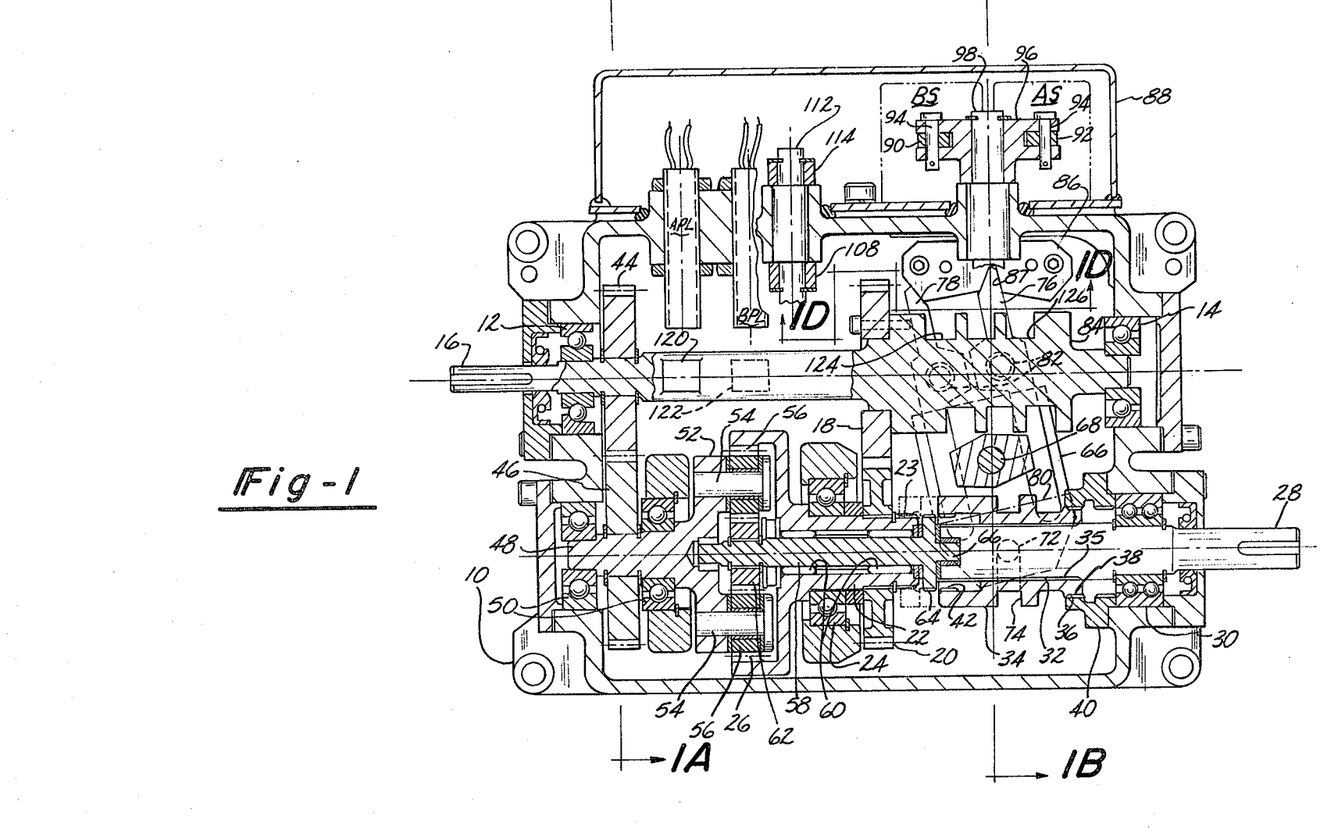
FIG. 1 is a longitudinally cross-sectioned view of a simplified geared positive clutch system embodying my invention.

A primary driver gear 18 secured to and rotating with an intermediate portion of the input shaft 16 is in constant driving mesh with a primary driven gear 20 splined to and rotating a primary driver shaft 22 carried by a bearing assembly 24. A planetary input internal ring gear 26 is formed integrally with the shaft 22 to function as will be described hereinafter.

A primary output shaft 28 is rotatably carried by the housing 10 in a bearing assembly 30 and has splines 32 on its internal end, its external end being adapted for connection to any desired transmission output user (not shown).

A primary driven gear member 34 is internally splined as at 35 to be carried on the splines 32 of the shaft 28 to drivingly rotate same and be selectively axially shiftable thereon. External gear splines 36 provided on the gear member 34 are adapted to selectively mesh with internal gear splines 38 of a positive stop member 40, which is affixed to the housing 10, when the driven gear member 34 is shifted to the right-hand solid line position shown in FIG. 1. Internal gear splines 42 are also provided for driving of the gear member 34 and the primary output shaft 28 in a manner to be described hereinafter.

A two-stage ratio alternater system of the present invention comprises ratio alternater gear and planetary gear components. The ratio alternator gear components comprise a radially non-uniform driver gear 44 mounted on the primary input shaft 16 for continuous rotation therewith and in constant driving gear mesh with a complementary radially non-uniform driven gear 46 which is mounted on a planetary reaction member shaft 48 to rotate same, the shaft 48 being rotatably carried by bearing assemblies 50.

The planetary gear components of the ratio alternater comprise a reaction member spider 52 integrally formed with the shaft 48 and carrying planet gear shafts 54 on which planet gears 56 are rotatably mounted for constant gear mesh with the planetary input internal ring gear 26.

A ratio alternator output shaft 58 is rotatably carried by a bearing 60 internally of the primary driver shaft 22 as shown and has a planetary output sun gear 62 mounted thereon for constant gear mesh with the planet gears 56.

A ratio alternator driver output splined element 64 is integrally formed on the other end of the shaft 58, which has a stub end 66 rotatably supported in the inner end of the primary output shaft 28 as shown, the two shafts being axially aligned.

In operation, the constant mesh gears 44 and 46 function to continuously rotate the reaction member spider 52 alternatingly between minimum and maximum rotational values which operate in conjunction with the continuously rotating ring gear 26 to produce rotational values of the ratio alternator output shaft 58 continuously alternating between zero, thus synchronous with the positive stop member 40, and the 1:1 rotational value of the continuously rotating primary driver shaft 22.

Figure 1A:
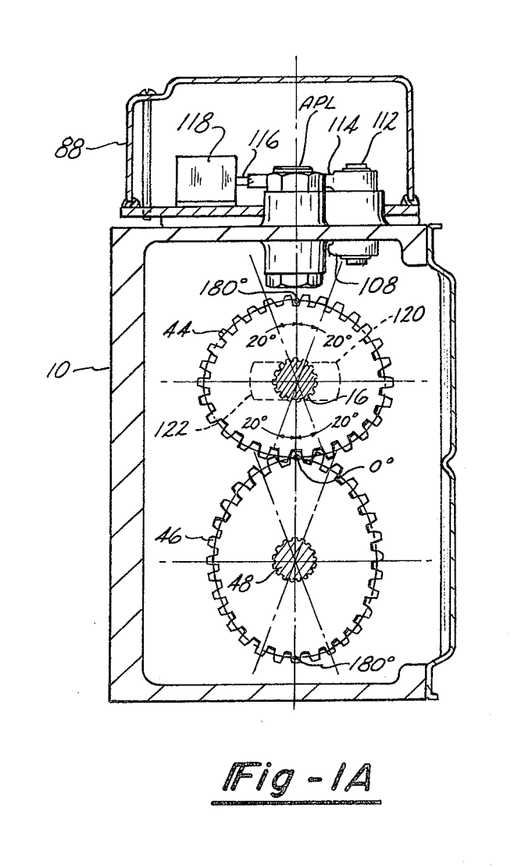
FIGS. 1A and 1B are transversely cross-sectioned views respectively taken substantially on the lines 1A—1A and 1B—1B of FIG. 1.

The preferred configuration of the ratio alternator gears 44 and 46 is shown in FIG. 1A, in which the illustrated position is that at which substantially zero rotational output of the ratio alternator output shaft 58 is effected. The ratio alternator gears 44 and 46 are formed with constant radii meshing gear teeth for about 20° on each side of the point marked 0 which is on a center line extending between their two axes. Assuming counterclockwise rotation of the driver gear 44, the radius thereof in mesh increases from the point 20° to the left of the 0° point to a point 20° to the left of the indicated 180° point, while the gear tooth radius of the driven gear 46 correspondingly decreases over a like portion, to thereby accelerate the driven gear 46 to a value which effects a direct drive output rotational value of the ratio alternater output shaft 58. From 20° before to 20° after the 180° points, the radii of the gears 44 and 46 are again constant. From the point 20° to the right of the 180° point to a point 20° to the right of the 0° point, the radius of the driver gear 44 decreases and the corresponding radius portion of the driven gear 46 increases, decelerating the driven gear 46 to effect the next zero rotational value of the ratio alternator output shaft 58.

During that period of the cycle described in which the ratio alternater output shaft 58, and hence the driver output element 64, is at a zero rotational value, the primary driven gear member 34 may be selectively shifted to the left from the position illustrated in FIG. 1 to engage its internal splines 42 with the splines of the output element 64 while simultaneously disengaging the splines 36 from the internal splines 38 of the positive stop member 40. The driver output element 64 will then accelerate the primary output shaft 28 to that value at which its rotation is synchronized with the rotation of the primary driver shaft 22. During that portion of the cycle in which the rotations of these shafts are thus synchronized, the driven gear member 34 will be automatically shifted further to the left to engage the splines 42 with the splines 23 of the shaft 22, thus effecting a direct drive from the primary input shaft 16 to the primary output shaft 28 through the gears 18 and 20 and the driven gear member 34.

Then, at any time the ratio alternater driver output element 64 is again rotating synchronously with the shaft 22, the driven gear member 34 may be selectively shifted to the right, disengaging the splines 42 from the splines 23 and simultaneously engaging the splines 42 with the ratio alternator driver output element 64. During the next portion of the ratio alternator cycle, the element 64 decelerates the primary output shaft 28 to zero rotational value and, while the splines 36 are synchronized with the splines 38 of the positive stop member 40, the gear member 34 will be automatically shifted further to the right to the position seen in FIG. 1 to engage the splines and maintain the primary output shaft 28 in its positive stopped position.

It will be apparent that since the entire system is in gear mesh throughout all shifting cycles, all gear and spline tooth-to-tooth space alignment will be precisely maintained for the above described shifting functions.

Figure 1B:
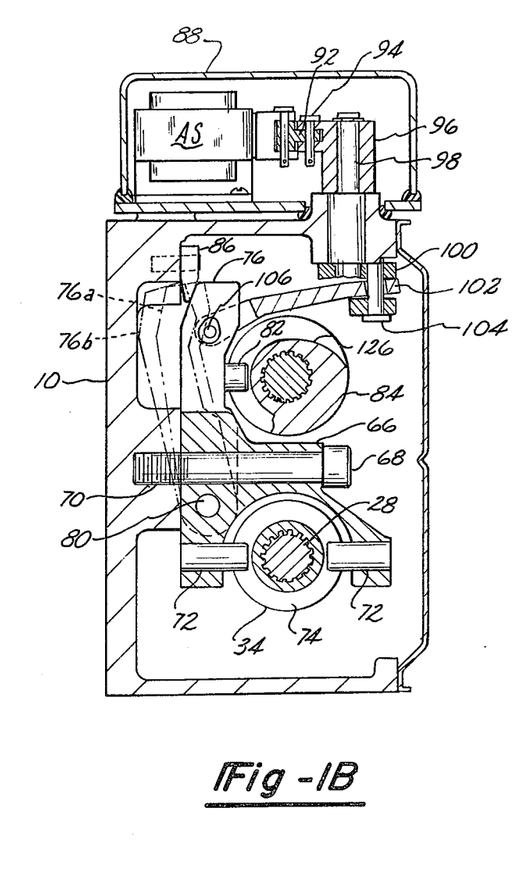

Shifting functions are accurately related to the aforementioned shaft rotations to effect shifting of the gear member 34 only at the precisely synchronized portions of the ratio alternator cycles. The shifter mechanism, as seen in FIGS. 1 and 1B, comprises a shifter fork member 66 pivotally carried on a bolt 68 threadedly mounted to the housing 10 as at 70 and has shifter fork elements 72 engaged in an annular groove 74 provided around the periphery of the primary driven gear member 34. When the fork member 66 is rotated on the bolt 68, it effects shifting of the gear member 34, as previously described, between the full-line and phantom line positions shown in FIG. 1.

A pair of shift fingers 76 and 78 are pivotally mounted on the fork member 66 by means of a pin 80 which extends perpendicularly to the axis of the bolt 68 on which the fork member 66 is pivoted. The shift fingers 76 and 78 have mounted thereon cam followers 82 which are selectively alternatively engaged in camming grooves (to be described) formed on the periphery of a shifter cam 84 which is integral with the primary input shaft 16 to rotate continuously therewith.

A shift stop plate 86 is secured to the housing 10 and extends into the area traversed by the ends of the shift fingers 76 and 78 to fix the travel thereof within prescribed limits and to maintain proper engagement of the cam followers 82 in the tracks of the shifter cam 84.

For example, the shift finger 76 (or 78) may take the solid line position indicated in FIG. 1B such that its follower 82 will be engaged with the shifter cam 84 and the lower end of the shift finger will be on top of the stop plate 86 so that it may be moved with the fork member 66 on the axis of the bolt 68. This will be called the raised or cam action position. The shift finger 76 (or 78) may take the position indicated in FIG. 1B by the phantom line 76a, in which position its follower 82 is disengaged from the shifter cam 84 and the end of the shift finger is engaged at one or the other end of the shift stop plate 86 or at a central slot 87 provided thereiin, thus preventing movement about the axis of the bolt 68. This will be called the neutral or locked position. Finally, the shift finger 76 (or 78) may be lowered to the lower side of the shift stop plate 86 where it is free to move with the fork member 66 about the axis of the bolt 68, the shift stop plate 86 preventing the shift finger 76 (or 78) from raising until a shift cycle is completed. This will be called the lowered or inactive position.

A pair of shifter solenoids AS and BS are provided in a control housing 88 mounted on the main housing 10, for the actuation of solenoid links 90 and 92 which are pivotally mounted by pins 94 to the ends of an outside solenoid actuator arm 96 extending from a shaft 98 pivotally carried by and extending through the housing 10. An inside solenoid actuator arm 100 is mounted to the inner end of the shaft 98 for pivoting therewith, and the ends of the arm 100 are respectively connected to the shift fingers 76 and 78 by links 102 which are pivotally mounted to the actuator arm 100 by pins 104 and to the shift fingers 76 and 78 by pins 106. Selective alternative actuation of the solenoid AS or BS will thus raise one or the other of the shift fingers 76 or 78 into cam action position disengaged from and above the shift stop plate 86, and lower the other shift finger 76 or 78 to the inactive position disengaged from and below the shift stop plate 86.

Figure 1C:
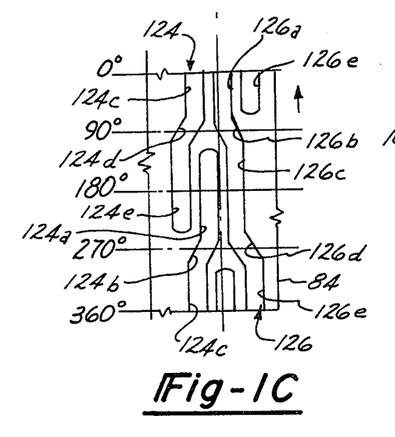
FIG. 1C is a diagrammatic plan development of a shifter cam incorporated in the invention.
Figure 1D:
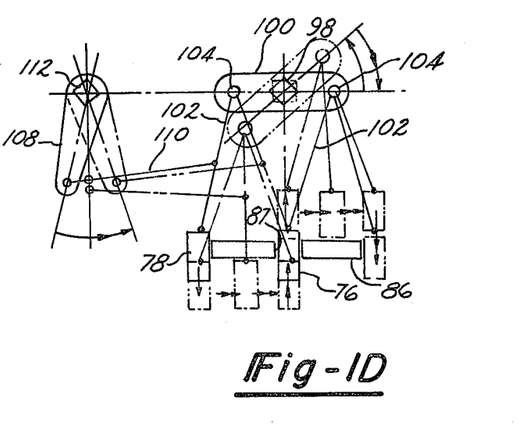
FIG. 1D is a diagrammatic representation of shifter system components as seen substantially from the line 1D—1D of FIG. 1, and illustrating selected shift functions.

A shift position indicator inside switch arm 108, shown only fragmentarily in FIGS. 1 and 1A, and indicated otherwise in the diagrammatic FIG. 1D, is connected by means of a link 110 (shown only in FIG. 1D) to one of the inside solenoid actuator arm links 102 for actuation thereby during the shift operations of the fork member 66. The switch arm 108 is mounted on a shaft 112 extending through the wall of the housing 10 and having an outside position indicator switch arm 114 (FIGS. 1A and 1F) engaged as shown with the toggle 116 of a shift position indicator switch 118.

A pair of cam lobes 120 and 122 extend one from each side of the primary input shaft 16 as shown in FIGS. 1 and 1A for rotation therewith, the outer ends of the cam lobes thus being adapted as the input shaft 16 rotates to alternately pass closely to the ends of a pair of proximity limit switches APL and BPL secured as shown in FIG. 1 into the wall of the housing 10, for operation as will be explained hereinafter.

The shifter cam 84 previously noted is provided with two cam grooves 124 and 126 into which one or the other of the shift finger followers 82 will be selectively engaged for shifting operations of the fork member 66. A diagrammatic plan development of the cam grooves 124 and 126 is illustrated in FIG. 1C.

Cyclic accurately synchronized shifting functions of the heretofore described constant gear mesh clutch is as follows, beginning at the solid line positions of the components illustrated in FIGS. 1 through 1F:

With the primary input shaft 16 constantly driven at any acceptable input speed, thereupon driving the primary driver shaft 22 at a rotational value which is substantially constant relative to the input shaft 16, the ratio alternater driver output gear 64 is thereby driven at a constantly alternating output rotational value, by means of the planetary ratio alternater components previously described, between zero rotational output through a variable ratio acceleration to a rotational value and angular positioning synchronized with the rotational value and angular positioning of the splines 23 of the primary driver shaft 22 for one-half of a cycle, and then through a variable ratio deceleration back to zero for the other one-half of the cycle.

The primary output shaft 28 is, in the solid line position shown, locked at zero rotational output due to the engagement of the primary driven gear member splines 36 with the positive stop member splines 38.

Figure 1D:
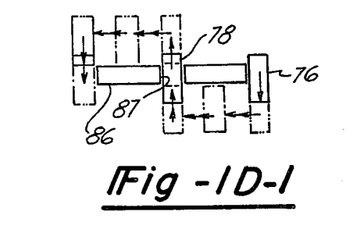
Figure 1D:
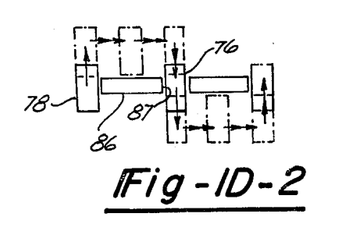
Figure 1D:
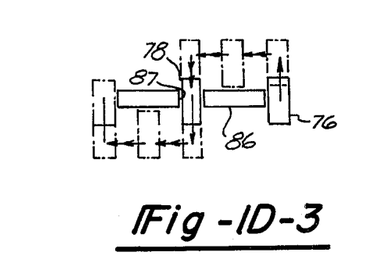
Figure 1E:
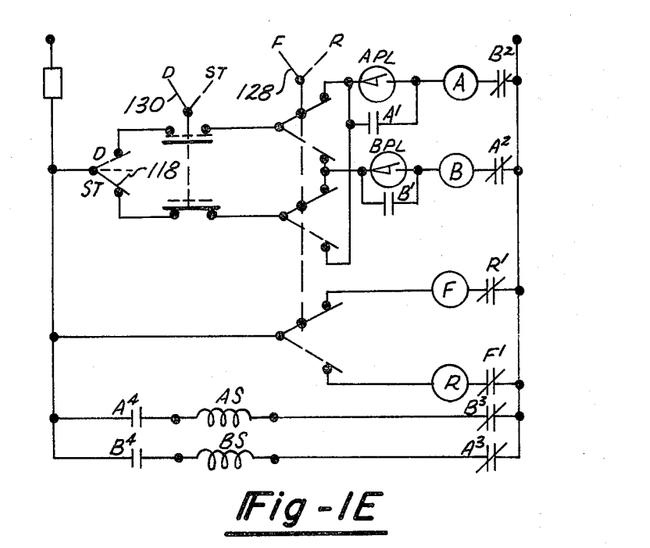
FIG. 1E is an electrical diagram of a preferred control system for the mechanisms of FIG. 1.

At any desired time, the electrical-mechanical shifter system may be actuated. FIG. 1E illustrates a preferred simplified electrical system which may be used for this purpose. With a forward-reverse input directional switch 128 in the forward (F) position shown (with counterclockwise input rotation as viewed from the left side of FIG. 1), a manual shift initiator switch 130 may be moved to the direct drive (D) shift position illustrated, closing a circuit to the proximity switch BPL. At the moment that the cam lobe 122 on the primary input shaft 16 is rotated to the proximity switch BPL, it closes to complete the circuit to actuate a relay B, which closes normally open holding contacts $B^1$ around the proximity switch BPL, opens normally closed contacts $B^2$ in the proximity switch APL circuit and normally closed contacts $B^3$ in the solenoid AS circuit, while closing normally open contacts $B^4$ in the solenoid BS circuit. This energizes the solenoid BS to rotate the outside solenoid actuator arm 96 counterclockwise as indicated by the single-headed directional arrows in FIG. 1F, and through the shaft 98 the inside solenoid actuator arm 100 as shown in FIG. 1D.

This raises the shift finger 76 to disengage it from the central slot 87 of the shift stop plate 86, and lowers the shift finger 78 to disengage it from the left end (as viewed in FIGS. 1 and 1D) of the shift stop plate 86, all as indicated by the single-headed directional arrows in FIG. 1D.

The raising of the shift finger 76 engages its cam follower 82 with an annular portion 126a (FIG. 1C) of the cam groove 126 provided in the rotating shifter cam 84. This cam is rotating counterclockwise as viewed in FIG. 1B and in the direction of the arrow indicated on the right side of FIG. 1C. As it rotates, the follower 82 moves into an angular shift portion 126b of the cam groove 126, causing the fork member 66 to rotate clockwise as viewed in FIG. 1, effecting a shift of the primary driven gear member 34 to the left, disengaging the primary driven gear member splines 36 from the splines 38 of the positive stop member 40, while simultaneously engaging the internal splines 42 with the splines of the ratio alternater driver output element 64 which is at a zero rotational value for that period during which the ratio alternater driver and driven gears 44 and 46 are engaged at constant radii from 20° before to 20° after the 0° point, with the teeth of the splines 42 being substantially in line with the tooth spaces of the driver output element 64. The angled cam portion 126b extends approximately 20 arcuate degrees each side of the 90° line indicated in FIG. 1C to correspond with these constant radii portions of the ratio alternater gears 44 and 46.

Next, the follower 82 of the shift finger 76 moves into an arcuate ratio alternator dwell portion 126c of the cam groove 126 during that period at which the ratio alternator driver gear 44 is rotating with gear teeth on an increasing radius in mesh with decreasing radii gear teeth of the ratio alternator driven gear 46, which, due to the ratio configuration of the ratio alternator gears and the planetary gears, accelerates the ratio alternator driver output element 64 to likewise accelerate the primary output shaft 28 on which the driven gear member 34 is carried.

When the maximum radius portion of the ratio alternater driver gear 44 from 20° before to 20° after the 180° point is driving the ratio alternator driven gear 46, the ratio alternater driver output element 64 is at the same rotational value as the primary driver shaft 22, at which time the follower 82 moves into an angular shift portion 126d of the cam groove 126, further pivoting the fork member 66 clockwise as viewed in FIG. 1 to shift the primary driven gear member 34 further to the left, simultaneously disengaging its splines 42 from the ratio alternator driver output element 64 while simultaneously engaging the splines 42 with the splines 23 of the primary driver shaft 22, so that direct drive is effected from the counterclockwise rotating primary input shaft 16 to the clockwise rotating primary output shaft 28 through the gears 18 and 20. The arcuate extent of the cam shift portion 126d is 20° either side of the 270° line shown in FIG. 1C to correspond with aforesaid ratio alternator gear constant radii.

It will be seen by referring to FIG. 1D that during the above described shifting motions, the shift fingers 76 and 78 moving laterally to the right as seen and as indicated by the double-headed arrows, the shift stop plate positively prevents the shift fingers from returning to their neutral positions, and thus the follower 82, FIG. 1B, is maintained in positive camming position in the groove 126 until the shift finger 76 has moved completely to the right, where it moves off of the top side of the shift stop plate 86, at which time the follower 82 enters a final arcuate run-out portion 126e of the cam groove 126, which portion slopes outwardly, as does the cam groove portion shown in FIG. 1B, to merge with the outer periphery of the shifter cam 84. Since the shift finger 76 (referring to FIGS. 1 and 1D) has in this position been moved to the extreme right side of the shift stop plate 86, the run-out portion 126e pushes the shift finger 72 back into the plane of the shift stop plate 86, while the action of the links 102 and arm 100 will raise the other shift finger 78 into the shift stop plate slot 87.

As the link 102 connected with the shift finger 78 (as seen in FIG. 1D) moves to the right therewith, the link 110 connecting the link 102 with the inside position indicator switch arm 108 moves it through the phantom line positions indicated so that the outside position indicator switch arm 114 (FIG. 1F) actuates the toggle 116 of the shift position indicator switch 118, moving it to the direct drive (D) position shown in FIG. 1E, thereupon breaking the circuit to the solenoid relay B and deenergizing the solenoid BS, which is mechanically returned to its neutral position.

To reverse the shifting function, the manual switch 130 may be moved to the stop (ST) position, completing the circuit to the proximity limit switch APL. At such time as the cam lobe 120 moves close to the proximity switch APL, it closes to complete the circuit actuating a solenoid relay A, which closes normally open circuit holding contacts $A^1$ around the proximity limit switch APL, opens normally closed contacts $A^2$ in the proximity switch BPL circuit, opens contacts $A^3$ in the solenoid BS circuit, and closes normally open contacts $A^4$ in the solenoid AS circuit. The solenoid AS then acts to rotate the solenoid actuator arm 100 clockwise, as viewed in FIG. 1D and indicated by the double-headed arrow, to raise the shift finger 78 to its raised or cam action position out of the shift stop plate slot 87, and to lower the shift finger 76 to its inactive position free of the right end of the shift stop plate 86, as indicated in FIG. 1D-1.

The follower 82 on the shift finger 78 will become positively engaged in an annular portion 124a of the cam groove 126 indicated in the layout of FIG. 1C. Since the shifter cam 84 is rotating in the same direction previously indicated (directional arrow), the follower 82 will move into an angled shift portion 124b, causing the fork member 66 to rotate counterclockwise (as seen in FIG. 1) at such time as the ratio alternator driver output element 64 is rotating synchronously with the primary driver shaft 22, so that the splines 42 of the primary driven gear member 34 will disengage from the driver shaft splines 23 and simultaneously engage with the splines of the ratio alternator driver output element 64. This occurs when the teeth of the ratio alternator driver gear 44 from 20° before to 20° after the 180° point shown in FIG. 1A are in mesh with the teeth extending from 20° before to 20° after the 80° point of the ratio alternater driven gear 46. The cam portion 124b extends a corresponding 20° before to 20° after the 270° line of FIG. 1C. Rotation of the ratio alternater driver gear 44 in the counterclockwise direction then engages decreasing radius teeth with the ratio alternator driven gear 46 increasing radii teeth to effect, through the planetary gearing, a deceleration of the ratio alternater driver output element 64 and the primary driven gear member 34 to slow the primary output shaft 28 to a zero rotational value, the follower 82 during this period having moved into an annular dwell portion 124c of the cam groove 124.

Next, the follower 82 moves into another angled shift portion 124d, effecting a further shift of the primary driven gear member 34 to the right, disengaging its splines 42 from the ratio alternater driver output element 64 while engaging the splines 36 with the splines 38 of the positive stop member 40. The follower 82 then moves into an annular run-out portion 124e of the cam groove 124 which is formed on a radius increasing to merge with the outer periphery of the shifter cam 84 similarly as the previously described run-out portion 126e. At this time, referring again to FIG. 1D-1, the shift finger 78 has moved to the left end of the shift stop plate 86, and the shift finger 76 has moved into line with the slot 87, so that the run-out portion 124e of the cam groove 124 will move the shift finger 78 back to its original neutral locked position, and the shift finger 76 will be raised by the action of the links 102 and arm 100 into the slot 87.

While the shift fingers are moved laterally as above described, the connecting link 110 to the position indicator switch arm 108 actuates it to rotate the outside position indicator switch 118 back to the stop (ST) position shown in FIG. 1E. This breaks the circuit to the solenoid relay A, deenergizing the solenoid AS, so that at the end of the above described cycle all components will be in the position of FIG. 1 once again.

The system as shown and described can operate with the input drive in a reverse rotating function, with the ratio alternater driver gear 44 rotating clockwise as viewed in FIG. 1B.

For such operation, the manual switch 128 shown in FIG. 1E is moved to the reverse (R) position, energizing a motor reverse relay R which reverses the rotational direction of the drive motor (not shown) and opens normally closed contacts $R^1$ in a motor forward relay (F) circuit.

In this condition, when the switch 130 is actuated to the direct (D) position shown in FIG. 1E, the circuit to the proximity limit switch APL is closed, and when the cam lobe 120 on the primary input shaft 116 rotates close to the proximity limit switch APL, it closes to complete the circuit to the relay A, which closes the holding circuit contacts $A^1$, opens the contacts $A^2$ in the proximity limit switch BPL circuit, opens the contacts $A^3$ in the solenoid BS circuit, and closes the contacts $A^4$ in the solenoid AS circuit. The solenoid AS, when energized, rotates the solenoid actuator arm 100 clockwise as viewed in FIG. 1D and indicated by the double-headed directional arrow, raising the shift finger 78, as shown in FIG. 1D-2, to its cam action position, and lowering the shift finger 76 to its inactive position. The follower 82 of the shift finger 78 will thus be engaged in the annular run-out portion 124e of the cam groove 124, and the shifter cam 84 will first cause the follower 82 to move into the angled portion 124d effecting the first shift action which has been previously described. After a shift dwell, the follower 82 moves into the next angled cam groove portion 124b, the second previously described shift action is effected, thereby shifting the transmission into its direct drive position, following which the follower 82 moves into the run-out portion 124a, its end being formed on an increasing radius, similar to the other run-out portions described, to once again move the shift fingers 76 and 78 back to their neutral locked positions indicated in phantom lines in FIG. 1D-2.

The position indicator switch 118 has now been moved to the direct drive (D) position, breaking the circuit to the solenoid relay A, thus deenergizing the solenoid AS.

Similarly, to shift the transmission back to its stop position, the manual switch 130 will be moved to the stop (ST) position shown in FIG. 1E, completing the circuit to the proximity limit switch BPL. When the cam lobe 122 on the primary input shaft 16 passes close to the proximity limit switch BPL, it closes to complete the circuit to the relay B. This closes the holding circuit contacts $B^1$, opens the contact $B^2$ in the proximity limit switch APL circuit, opens the contacts $B^3$ in the solenoid AS circuit, and closes the contacts $B^4$ in the solenoid BS circuit. With the solenoid BS thus energized, the solenoid actuator arm 100 is rotated counterclockwise as viewed in FIG. 1D, lowering the shift finger 78 to its inactive position as viewed in FIG. 1D-3, and raising the shift finger 76 to the cam action position where its follower 82 engages in the run-out portion 126e of the cam groove 126. The follower 82 then moves into the angled shift portion 126d to effect the first shift action previously described, after which the follower 82 moves into the ratio alternater dwell portion 126c to appropriately effect deceleration of the primary output shaft 28. The follower 82 then moves into the angled shift portion 126b to effect the final shift action, and finally moves into the run-out portion 126a which moves the shift finger 76 once again downward into the shift stop plate slot 87, and raises the shift finger 78 in line with the left side of the shift stop plate 86.

The position indicator switch 118 has now once again been moved to the stop (ST) position, breaking the circuit to the relay B to deenergize the solenoid BS.

The shifting system for effecting the accurately timed shift cycles heretofore described is relatively simplified in comparison to other shifting devices and systems shown in my two prior patents noted herein, but it will be quite clear that innumerable shifter systems may be developed with substantially similar functions. In all cases, however, it is essential, for proper selection of gears to achieve synchronization and gear tooth-to-tooth space matching, that everything be driven from the input shaft, either directly or indirectly.

It will also be noted that the particular configuration of the ratio alternater gears 44 and 46, as well as the type and ratios of the planetary gearing components of the ratio alternater system, will determine the minimum and maximum rotational values of the ratio alternater output element 64, and innumerable variations from the described functions are therefore possible. For example, the ratio alternater system can be readily arranged to produce rotation of the ratio alternater driver output element 64 into reverse of the direct drive rotation rather than the zero rotational value heretofore described, and appropriate reverse gearing from the input shaft 16 can be provided so that the primary output shaft 28 will be driven from one rotational direction through zero to an opposite rotational direction at a desired rotational value with constant gear mesh.

It will also be noted that the proximity switches APL and BPL which are used to start shifting action may be installed in positions other than those shown, adjacent any moving element of the primary drive train which is in continuous drive operation. Other types of switches may also be used to like purpose.

It will be apparent to ones familiar with control systems that the basic system illustrated in FIG. 1E may be modified to suit any other control requirements. Controls may be either manual, semi-automatic, or completely automatic, and may incorporate punch-card, numerical or tape controls. The "start" signal producing switches (APL and BPL) may also be used to signal each revolution of the input shaft 16 (and in the illustrated embodiment also the output shaft 28) for automatically counting the produced output shaft revolutions and producing a signal to start shifting at that moment which will result in stopping after any desired preselected number of revolutions.

Basically, many combinations of ratio alternator gears and planetary ratio alternater components can be conceived to produce desired outputs of almost any rotational values desired, either in the same rotational direction or in opposite rotational directions.

Figure 2:
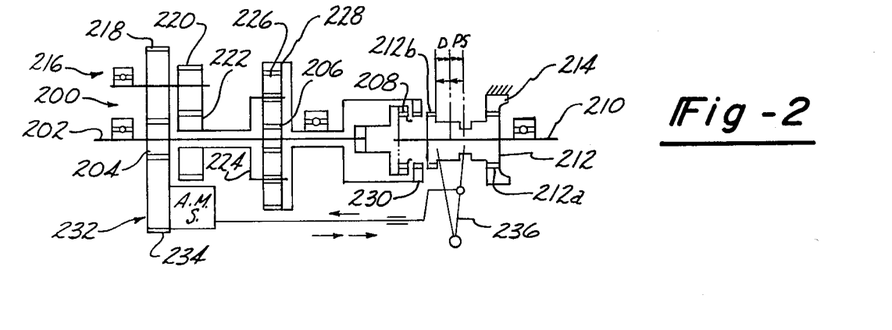
FIG. 2 is a diagrammatic longitudinal view of another geared positive clutch system embodying the invention.

FIG. 2 illustrates another type of geared positive clutch system incorporating a somewhat different planetary ratio alternater to effect the desired constant acceleration and deceleration values for synchronous shifting. As illustrated, a primary drive system 200 comprises a rotatable input shaft 202 having fixed thereto an input drive gear 204, a planetary input sun gear 206, and a direct drive internal gear 208. A rotatable output shaft 210 has an output driven gear member 212 rotatable therewith and axially shiftable thereon, as indicated, between a positive stop (PS) position in which one gear 212a is meshed with a fixed member 214, and a direct drive (D) position in which another gear 212b is meshed with the direct drive internal gear 208 positively connecting the input shaft 202 with the output shaft 210.

A two-stage planetary ratio alternator drive system 216 in the modification of FIG. 2 comprises a ratio alternator input driven gear 218 rotated by the input drive gear 204 and having a radially non-uniform ratio alternator driver gear 220 integrally fixed therewith for constant gear mesh with a complementary radially non-uniform ratio alternater driver gear 222. These ratio alternater elements may be of the gear type shown, or may be of any other variety as shown in my U.S. Pat. Nos. 3,468,177 and 3,659,479, depending on requirements.

The ratio alternater driven gear 222 is mounted on a shaft for rotating a reaction member planet carrier 224. Planet gears 226 rotatable on the planet carrier 224 are constantly meshed with the sun gear 206 and with a planetary output internal ring gear 228 which is rotatable with a ratio alternater output driver internal gear 230. The relative ratio values of the driver and the driven gears 220 and 222 are selected to effect continuous alternate acceleration and deceleration of the planet carrier 224 between the minimum rotational value required to produce a direct drive planetary ratio and a maximum rotational value which is predetermined to effect a substantially zero output rotation of the ring gear 228 and the internal gear 230 rotating therewith.

A diagrammatically represented automatic mechanical shifter system 232 comprises a permanently synchronized automatically cycled mechanism designated A.M.S. which is driven by a shift driver gear 234 in constant mesh with the input drive gear 204, and operates in synchronous relationship with the functions of the ratio alternator drive system 216 to effect the necessary positive synchronous shift actions of the output driven gear member 212 through a shifter arm 236, similarly as described for the FIG. 1 modification.

In the position of FIG. 2, the output driven gear member 212 has splines 212a engaged with the fixed member 214 thereby holding the output shaft 210 in a positive stop condition. Upon selective actuation of the automatic mechanical shifter system 232 the output driven gear member 212 will be first synchronously shifted to disengage the splines 212a from the fixed member 214 and to substantially simultaneously engage splines 212b with the ratio alternator output driver internal gear 230 at such time as it is rotating at substantially zero value when the ratio alternator drive system 216 is functioning at its maximum ratio value. During a dwell period, the ratio alternator drive system 216 will drivingly accelerate the output driven gear member 212 with the output shaft 210 toward direct drive, at which time a further shift action will disengage the splines 212b of the output driven gear member 212 from the ratio alternator output driver internal gear 230 and substantially simultaneously engage it with the direct drive internal gear 208 with the ratio alternator drive system 216 is functioning at its minimum ratio value, effecting a direct drive 1:1 ratio between the input and output shafts.

Selective shifting from a direct drive (D) to positive stop (PS) is accomplished similarly with opposite functions as indicated by the double-headed arrows in the diagram.

Figure 3:
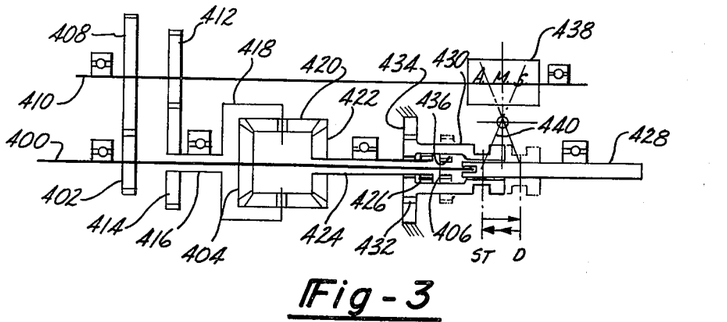
FIGS. 3 and 4 are diagrammatic longitudinal views of other geared positive clutch systems.

FIG. 3 illustrates a further embodiment of the invention showing a geared positive clutch system which will not produce any output shaft revolutions during either shift cycle. As shown, a primary drive system input shaft 400 has an input driver gear 402, a planetary input miter gear 404 and a primary output driver gear 406 mounted for rotation therewith.

The input driver gear 402 is in constant mesh with a larger reduction gear 408 mounted for rotation with a shaft 410 which has a radially non-uniform ratio alternator driver gear 412 in constant driving mesh with a complementary radially non-uniform ratio alternater driven gear 414 mounted on a rotatable shaft 416.

A planet carrier 418 is mounted for rotation with the shaft 416 and rotatably carries a set of planetary reaction member miter gears 420 in constant mesh with the planetary input miter gear 404 and with a ratio alternator output miter gear 422 mounted for rotation with a ratio alternator output shaft 424 having fixed thereon a ratio alternator output driver gear 426 having the same radius as the primary output driver gear 406.

A rotatable primary drive system output shaft 428 carries for rotation therewith and for axial shifting action thereon an output driven gear member 430 having external splines 432 for selective engagement with a fixed internal spline stop member 434, and internal splines 436 adapted for selective shifting engagement alternatively with the ratio alternator output driver gear 426 and the primary output driver gear 406.

The ratio alternator gears 412 and 414 are arranged to drive the planet carrier 418 between selected minimum and maximum rotational values such as will continuously drive the ratio alternator output shaft 424 and its driver gear 426 at rotational values alternating between zero and a speed synchronous with the primary output driver gear 406.

Figure 1F:
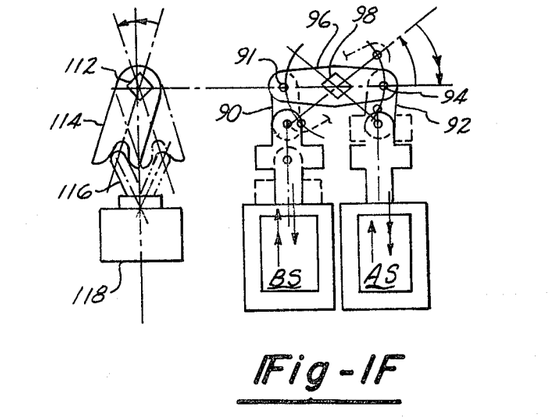
FIG. 1F is a diagrammatic representation of certain actuating components for the mechanisms of FIG. 1.

An automatic mechanical shifter system 438 (A.M.S.) which preferably functions similarly to the shifter system shown and described in relation to FIG. 1 through FIG. 1F is driven from the speed reduced shaft 410 from the primary input shaft 400 such that it operates synchronously with the functions of the speed reduced ratio alternator system components previously described, being operably connected with the output driven gear member 430 through a shifter fork 440 indicated diagrammatically in FIG. 3.

In operation, with the output driven gear member 430 in the solid line position shown, and its splines 432 engaged with the internal spline stop member 434 to hold the output shaft 428 in a positive stop position, at such time at the ratio alternator output driver gear 426 is at zero rotational value, the shifter system 438 may be actuated to shift the driven gear member 430 to the right, disengaging its splines 432 from the spline stop member 434 while simultaneously engaging its internal splines with the ratio alternater driver output gear 426. During a dwell period, the ratio alternator system accelerates the driver gear 426 to a rotational value synchronous with the rotational value of the primary output driver gear 406, at which time the shifter system 438 shifts the output driven gear member 430 again to the right, disengaging the internal splines 436 thereof from the ratio alternator output driver gear 426 while simultaneously engaging with the primary output driver gear 406, which is the direct drive position. Shifting back to the positive stop position is accomplished by a reversal of the above described functions.

Figures 4, 4A:
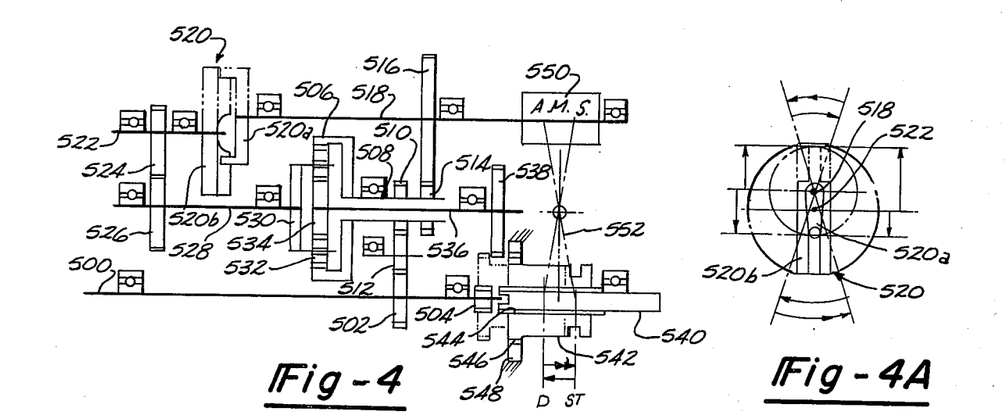
FIG. 4A is a diagrammatic cross-sectional view of a portion of the ratio alternator system of FIG. 4, and FIGS. 5, 6 and 7 are diagrammatic longitudinal views of still further geared positive clutch systems.

FIG. 4 illustrates another geared positive clutch system in which a rotatable primary input shaft 500 has fixed thereon and rotating therewith an input driver gear 502 and an output direct drive spline member 504.

A planetary input ring gear 506 is carried on a shaft 508 rotated by a driven gear 510 mounted thereon and constantly driven from the input driver gear 502 through a reversal idler gear 512. The driver shaft 508 also carries for rotation therewith a driver gear 514 in constant driving mesh with a larger reduction driven gear 516 carried on and rotating a ratio alternator shifter system driver shaft 518.

The planetary ratio alternater system in FIG. 4 consists of a three-stage device comprising a fork-to-slot type ratio alternator 520 in which a fork element 520a is mounted for rotation with the driver shaft 518 and engages in a slotted element 520b carried on a shaft 522 rotating on an axis offset from the axis of the shaft 518, so that the slotted element 520b and its shaft 522 rotate continuously between selected minimum and maximum ratios with respect to the shaft 508 as indicated in the cycle diagram of FIG. 4A and in a manner previously shown and described in my prior patents heretofore noted.

A radially non-uniform ratio alternater driver gear 524 is carried for rotation with the shaft 522 and drives a complementary radially non-uniform ratio alternator driven gear 526 to rotate a ratio alternator reaction member shaft 528 on which the gear 526 is mounted.

A ratio alternator planet carrier 530 is mounted for rotation with the shaft 528 and rotatably carries planet gears 532 which are in constant gear mesh with the planetary input ring gear 506 and a ratio alternator output sun gear 534 mounted for rotation with a ratio alternater output shaft 536. A ratio alternator output driver gear 538 is mounted for rotation with the shaft 536.

The fork-to-slot ratio alternater 520 and the ratio alternator gears 524 and 526 are arranged to produce a desired ratio alternation of the planet carrier 530 which effects a continuous drive, through the planetary components, of the ratio alternator output driver gear 538 alternating between preselected minimum and maximum rotational values.

A rotatable primary drive system output shaft 540 carries rotatably therewith and axially slidable thereon an output driven gear member 542 having internal splines 544 for selective shifting engagement with the output direct drive spline member 504 and external splines 546 for selective shifting engagement sequentially with the ratio alternater output driver gear 538 and a fixed positive stop spline member 548.

An automatic mechanical shifter (A.M.S.) device 550 preferably substantially the same as that described and illustrated in respect to FIG. 1 is driven from the ratio alternater-shifter system driver shaft 518 and has a shifter fork 552 operatively connected with the output driven gear member 542 for selective axial shifting thereof sequentially from the positive stop position shown in solid lines in which the splines 546 are engaged with the positive stop member 548, to engagement with the ratio alternater output driver gear 538 and then to engagement with the direct drive spline member 504 as indicated in phantom lines, in synchronized actions similar to those previously described for other modifications of the invention.

Figure 5:
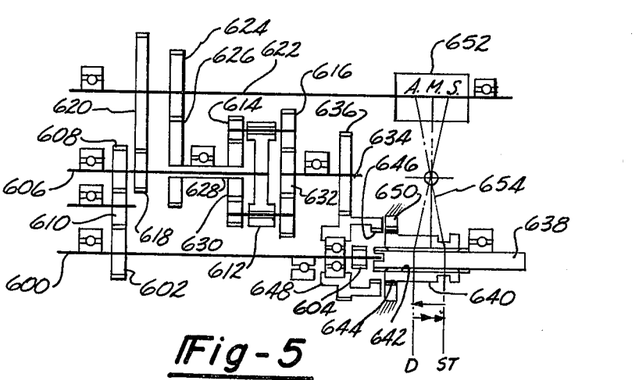

FIG. 5 illustrates a further modification of the invention of a geared positive clutch system in which a primary input shaft 600 has mounted for rotation therewith an input driver gear 602 and an output direct drive spline member 604.

A rotatable planetary input shaft 606 has a driven gear 608 for constant drive from the input driver gear 602 through a reverser idler gear 610, and carries for rotation an input planet carrier 612. Double sets of rotatable planet gears 614 and 616 are fixed together and rotatably carried as illustrated by the planet carrier 612.

A further gear 618 is carried for rotation with the planetary input shaft 606 and is in constant mesh with a larger reduction driven gear 620 mounted for rotation with a ratio alternator-shifter system driver shaft 622 which carries for rotation therewith a radially non-uniform ratio alternator driver gear 624. A complementary radially non-uniform ratio alternator driven gear 626 is in continuous mesh with the driver gear 624 and is mounted for rotation with a shaft 628 carrying a first planetary reaction member sun gear 630 which is in constant mesh with the planet gears 614.

The planet gears 616, rotating with the planet gears 614, are in continuous mesh with a second planetary output sun gear 632 mounted for rotation with a shaft 634 which carries for rotation therewith a ratio alternater output driver gear 636.

A rotatable primary drive system output shaft 638 has an output driven gear member 640 carried for rotation therewith and axially slidable thereon, having internal splines 642 adapted for selective engagement with the output direct drive spline member 604, and external splines 644 adapted for selective engagement with an internally splined fixed positive stop member 650 and internal splines 646 of a ratio alternator driven output gear member 648 which is in constant gear mesh with the ratio alternater output driver gear 636 and rotatably carried on the shaft 600.

An automatic mechanical shifter (A.M.S) device 652 is driven from the ratio alternater-shifter system driver shaft 622 and has a shifter fork 654 operatively connected with the output driven gear member 640 to synchronously shift it from a positive stop to a direct drive position in substantially the same fashion as previously described in relation to the other modifications.

Figure 6:
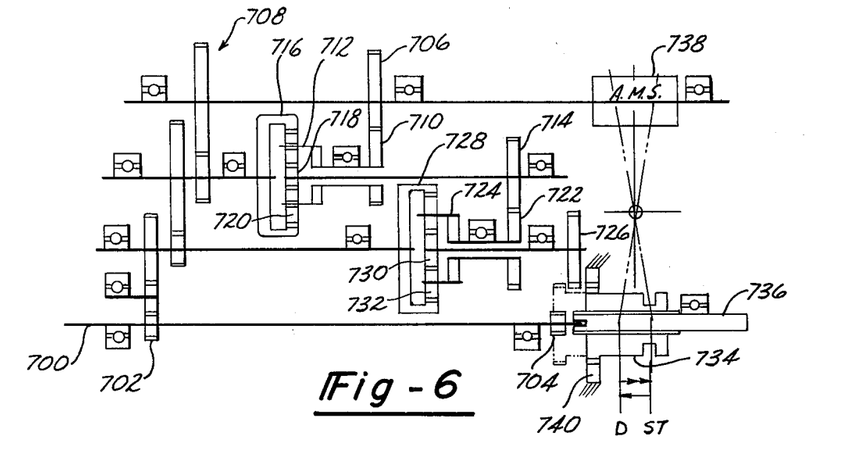

FIG. 6 illustrates yet another high speed positive drive gear clutch system in which an input shaft 700 has a ratio alternator input driver gear 702 and a primary output driver gear 704 rotating therewith. The gear 702 drives a first stage radially non-uniform ratio alternator driver gear 706 through reduction gear sets, collectively designated 708, as shown. The gear 706 drives a complementary ratio alternator driven gear 710, and a reaction member planet carrier 712 shaft connected therewith, alternating between selected minimum and maximum rotational values which effect selected minimum and maximum alternating rotational values of a first stage ratio alternater output gear 714 by virtue of the selected ratios of a first stage input driven planetary ring gear 716 and output driving sun gear 718 which are in constant mesh with first stage planet gears 720 rotatably mounted on the planet carrier 712, in a manner previously described in relation to other modifications.

The first stage output gear 714 is in constant mesh with a gear 722 to continuously alternatingly drive a second stage reaction member planet carrier 724 and thereby effect selected minimum and maximum alternating rotational values of a second stage ratio alternator output gear 726 by virtue of the selected ratio of a second stage input driven planetary ring gear 728 and output driving sun gear 730 which are in constant mesh with second stage planet gears 732 rotatably mounted on the planet carrier 724, also in a manner previously described.

As chosen, this unique double stage planetary ratio anternator system produces zero to direct drive output rotational values operable to accelerate or decelerate a primary output driven gear member 734 which is shifted on its primary output driver shaft 736 by an input reduced gear driven automatic mechanical shifter (A.M.S.) device 738 in a manner previously described between a position meshed with a fixed positive stop member 740 and a position meshed with the high speed driver gear 704.

Figure 7:
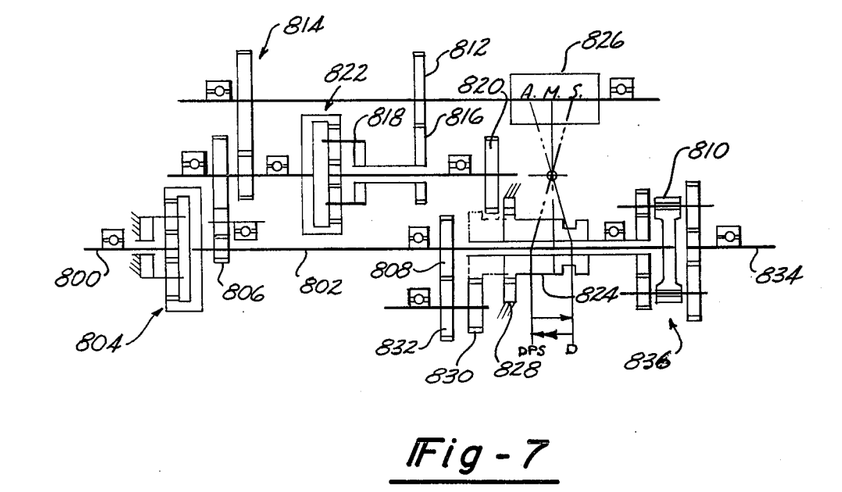

FIG. 7 illustrates a still further high speed positive drive gear clutch system which is a modification of the FIG. 6 system, wherein shifting is applied at the lower speed drive. As shown, an input shaft 800 drives a shaft 802 at high speed through a reverse planetary 804 to rotatably operate driver gears 806 and 808 and a second stage planetary input planet carrier 810.

A radially non-uniform ratio alternator driver gear 812 is input operated through reduction gear sets, collectively designated 814, and is in constant ratio alternating mesh with a complementary radially non-uniform ratio alternator driven gear 816 which rotates a first stage reaction member planet carrier 818 between selected minimum and maximum rotational value by virtue of the designed ratios of a first stage planetary 822 in a manner previously described and functions to accelerate or decelerate, through the planetary ratio alternator output gear 820, a primary output driven gear 824 which is shifted by an input reduction gear driven automatic mechanical shifter (A.M.S.) device 826 between engagement with a fixed positive stop member 828 and a primary driver gear 830 rotated through a reduction gear 832 from the input driver gear 808, respectively effecting the selected rotational values required to produce direct drive and zero rotational outputs of an output shaft 834 through a second stage planetary 836. When the primary output driven gear 824 is shifted into engagement (D) with the stop member 828, the output shaft 834 will be driven in direct drive (1:1 with the input or at other higher or lower speed) and when shifted (DPS) to be driven by the primary driver gear 830 the output shaft 834 will be driven at zero or "driven positive stop" rotation.

The interim type of shifting in FIG. 7 operates to avoid any backlash tolerance buildup which could occur if the shifted output driven gear 824 were more remotely driven from the ratio alternator system herein described.

Although I have shown and described only a few exemplary systems in the foregoing specification, it will be apparent to one skilled in the art to which the invention pertains that various changes and modifications may be made therein without departing from the spirit of the invention as expressed in the appended claims.

What is claimed is:

1. A positive constant gear-mesh positive clutch speed change system for a primary drive system having a primary input member, at least two primary output ratio determining members, and a primary output driven member selectively alternatively connected with said ratio determining members for first and second determined output rotational values, said speed change system comprising a planetary ratio alternator drive system and an automatic mechanical shifter system both drivingly connected with said primary input member at least during ratio changes, wherein:

a. said planetary ratio alternator drive system comprises a planetary input member, a planetary output member and a planetary reaction member constantly operably connecting the planetary input and output members, their relative ratios and output speeds being determined by the rotational value of said reaction member, and means continuously driving said reaction member alternately between minimum and maximum rotational value functions to effect continuous alternate rotation of said planetary output member between rotations synchronous with said ratio determining members; and b. said shifter system comprises means effecting selective operative connection of said primary output driven member with said ratio alternator planetary output member synchronously with said ratio alternator drive system functions for changing the primary input to output member relative ratios.

2. The system as in claim 1 wherein one of said ratio determining members is fixed at zero rotational value to produce zero output rotation.

3. The system as in claim 1 wherein one of said ratio determining members is driven directly by said primary input member to produce direct drive output rotation.

4. The system as in claim 2 wherein the other of said ratio determining members is driven directly by said primary input member to produce direct drive output rotation.

5. The system as in claim 1 wherein said ratio determining members, said primary output driven member and said ratio alternator planetary output member all comprise gear-like elements having spaced gear teeth constructed and arranged with said shifter system to effect substantially accurate gear tooth-to-tooth space alignment of members when same are being shifted into and out of said operative connections.

6. The system as in claim 1 wherein:
said shifter system when operating to shift said primary drive system between said output rotational values is constructed and arranged to effect a complete shift cycle comprising
a first shift action synchronously disconnecting said primary output member from one of said ratio determining members while substantially simultaneously connecting said primary output member with said planetary output member while same is rotating at one of its rotational values,
a second shift action dwell during which said planetary output member drivingly varies toward the other of its rotational values to positively vary the speed of said primary output member, and
a third shift action synchronously disconnecting said primary output member from said planetary output member while substantially simultaneously drivingly connecting said primary output member with the other of said ratio determining members while they are rotating substantially synchronously.

7. The system as in claim 2 wherein:
a. said shifter system when operating to shift said primary drive system from zero output to the other output rotational value is constructed and arranged to effect a complete shift cycle comprising
a first shift action synchronously disconnecting said primary output member from said fixed member while substantially simultaneously connecting said primary output member with said planetary output member while same is rotating at its minimum rotational value,
a second shift action dwell during which said planetary output member drivingly varies toward its maximum rotational value to positively accelerate said primary output member, and
a third shift action synchronously disconnecting said primary output member from said planetary output member while substantially simultaneously drivingly connecting said primary output member with the other ratio determining member while they are rotating substantially synchronously; and
b. said shifter system when operating to shift from said other output rotational value to zero output is operable to effect a complete shift cycle in reverse of the foregoing actions.

8. The system as in claim 4 wherein:
a. said shifter system when operating to shift said primary drive system from zero output to positive direct drive is constructed and arranged to effect a complete shift cycle comprising
a first shift action synchronously disconnecting said primary output member from said fixed member while substantially simultaneously connecting said primary output member with said planetary output member while same is rotating at its minimum rotational value,
a second shift action dwell during which said planetary output member drivingly varies toward its maximum rotational value to positively accelerate said primary output member, and
a third shift action synchronously disconnecting said primary output member from said planetary output member while substantially simultaneously drivingly connecting said primary output member with said primary input member while they are rotating substantially synchronously for direct drive; and
b. said shifter system when operating to shift from positive direct drive to zero output is operable to effect a complete shift cycle in reverse of the foregoing actions.

9. The system as in claim 1 wherein said means driving said reaction member comprises:
a. a first radially non-uniform gear element continuously driven by said primary input member at constant relative rotation; and
b. a second radially non-uniform gear element continuously meshed with and driven by said first gear element to alternate between selected minimum and maximum rotational values, and continously drivingly connected with said reaction member.

10. The system as in claim 9 wherein said gears have constant radius portions of selected arcuate extent intermediate non-constant radius portions, to thereby effect constant rotational values of said reaction member through selected portions of its rotation at its minimum and maximum rotational values during the aforesaid shifting functions.

11. The system as in claim 10 wherein said constant radius portions extend for selected arcuate portions to either side of an intermediate point thereof.

12. The system as in claim 1 wherein said planetary input member comprises an internal ring gear, said planetary output member comprises a sun gear, and said planetary reaction member comprises a planet carrier rotatable on an axis common with the axis of said ring and sun gears and carries at least one planet gear rotatable on an axis radially spaced from the aforesaid axes, said planet gear being in constant gear mesh with an intermediate said ring and sun gears.

13. The system as in claim 1 wherein said means driving said reaction member comprises:
a. a first radially non-uniform gear element continuously driven by said primary input member at constant relative rotation;
b. a second radially non-uniform gear element continuously meshed with and driven by said first gear element to alternate between selected minimum and maximum rotational values, and continuously drivingly connected with said reaction member;

c. said input member comprising an internal ring gear, said output member comprising a sun gear, and said reaction member comprising a planet carrier rotatable on an axis common with the axis of said ring and sun gears and carrying at least one planet gear rotatable on an axis radially spaced from the aforesaid axes, said planet gear being in constant gear mesh with and intermediate said ring and sun gear; and d. said planet carrier being connected with said second radially non-uniform gear for rotation therewith.

14. The system as in claim 1 wherein:
a. said primary input member comprises a driver shaft having a driver gear mounted for rotation therewith and constantly meshed with a driven gear mounted for rotation with said ratio alternater planetary input member;
b. said means driving said reaction member comprises a radially non-uniform driver gear mounted for rotation with said primary input member driver shaft and constantly meshed with a radially non-uniform driven gear mounted for rotation with said ratio alternater planetary reaction member; and
c. said planetary input, output and reaction members being rotatable on a common axis extending parallel with and spaced from said primary input member driver shaft.

15. The system as in claim 1 wherein:
a. said primary input member comprises a driver shaft having a driver gear mounted for rotation therewith and constantly meshed with a driven gear mounted for rotation with said ratio alternator planetary input member;
b. said planetary output member comprises a driven shaft having a planetary output gear in constant gear mesh connection through said planetary reaction member with said planetary input member;
c. said primary input member driven gear being mounted for rotation with a shaft rotatable on an axis common with said output member driven shaft; and
e. said shifter system means comprises a splined element carried for rotation with said primary output member driven shaft and axially shiftable therewith for selective sequential connection with said ratio determining members and said planetary output member driven shaft.

16. The system as in claim 15 wherein:
a. said primary input member driver shaft has peripheral shifter groove elements; and
b. said shifter system includes a pivotally mounted shifter fork in constant running engagement with said splined element and selectively engaged with said driver shaft shifter groove elements, said groove elements being formed to effect sequential axial shifting of said splined element when said shifter fork is engaged with said shifter grooves, for making said selected sequential connections.

17. The system as in claim 16 wherein said shifter system includes an actuator means selectively pivoting said shifter fork into engagement with said driver shaft shifter groove elements and having means operably sensing angular positions of said driver shaft for controlling such selective pivoting of said shifter fork to function relative to such angular positions.

18. The system as in claim 1 wherein said shifter system includes means sensing positions of said primary input member and is operable to functionally relate said operative connections functionally to each primary input member position.

19. The system as in claim 1 including reduction gearing constantly drivingly connected with and intermediate said primary input member and said ratio alternater planetary input member.

20. The system as in claim 1 including reduction gearing constantly drivingly connected with and intermediate said primary input member and said shifter system.

21. The system as in claim 1 and including a second planetary system having input, output and reaction members, said second planetary input member being constantly drivingly connected with said primary input member, said second planetary reaction member being constantly drivingly connected with said ratio alternator planetary output member, and said second planetary output member being selectively operably connected with said primary output driven member by operation of said shifter system.

22. The system as in claim 1 including an input and an output planetary reduction system, wherein:
a. the input planetary reduction system has a planetary input directly drivingly connected with said primary input member and a reduced speed planetary output constantly drivingly connected with said ratio alternator planetary input member and said means driving said reaction member;
b. said output planetary reduction system has a planetary input constantly drivingly connected with said input planetary system reduced speed output, a speed increasing planetary output driven member, and a planetary reaction member constantly drivingly connected with and intermediate said primary output driven member and said speed increasing planetary output driven member; and
c. at least one of said ratio determining members being constantly drivingly connected with said input planetary reduction system output for selective driving shift connection with said primary output driven member at a reduced speed.

23. The system as in claim 1 including reduction gearing constantly drivingly connected with and intermediate said primary input member and said ratio alternator driving means.

24. The system as in claim 23 wherein said reduction gearing is also constantly drivingly connected with and intermediate said primary input member and said shifter system.

25. The system as in claim 23 wherein said reduction gearing is also constantly drivingly connected with and intermediate said primary input member and said ratio alternator planetary input member.

26. The system as in claim 25 and including planetary reduction gearing constantly drivingly connected with said primary input member and further constantly drivingly connected with and intermediate said ratio alternator planetary output member and said primary output driven member.

27. A ratio alternater for use in varying input-to-output ratios of drive devices, comprising:
a. a planetary drive having an input member for driving an output member and a reaction member effecting operative connection of the input and output members, the input to output member relative ratios and output speeds being determined by the rotational value of said reaction member relative to said input member; and b. means substantially continuously driving said reaction member alternatingly between selected relative rotational values to effect continuously alternating planetary input to output member relative ratios between selected relative values, and said output member being selectively drivingly connected with said drive device to vary its driving ratio between selected relative values.

28. The ratio alternater as in claim 27 wherein:
a. said reaction and output members comprise sun gears rotatable on a common axis; and
b. said input member comprises a rotatable planet carrier carrying first and second planet gears rotatable on axes radially spaced from said common axis and respectively meshed with said sun gears.

29. The ratio alternater as in claim 27 wherein:
a. said reaction member comprises a rotatable planet carrier carrying planet gears rotatable on axes radially spaced from the carrier axis;
b. said output member comprises a rotatable sun gear meshed radially inwardly with said planet gears; and
c. said input member comprises a ring gear meshed radially outwardly with said planet gears.

30. The ratio alternater as in claim 27 wherein:
a. said reaction member comprises a rotatable planet carrier carrying planet gears rotatable on axes radially spaced from the carrier axis;
b. said input member comprises a rotatable sun gear meshed radially inwardly with said planet gears; and
c. said output member comprises a ring gear meshed radially outwardly with said planet gears.

31. The ratio alternator as in claim 27 wherein said means comprises:
a. a first driver element continuously alternatingly driving a first driven element between selected minimum and maximum rotational values relative to said first driver element;
b. a second driver element continuously driven by said first driven element and continuously alternatingly driving a second driven element between selected minimum and maximum rotational values relative to said second drive element; and
c. said second driven element being continuously drivingly connected with said reaction member.

32. The ratio alternater as in claim 31 wherein:
a. said first driver and driven elements comprise a crank element and a slotted element rotatable on offset axes and substantially continuously drivingly engaged; and
b. said second driver and driven elements comprise continuously meshed radially non-uniform gears.

33. The ratio alternator as in claim 27 wherein said means comprises a driver element continuously alternatingly driving a driven element between selected minimum and maximum speeds relative to said driver element, and said driven element being continuously drivingly connected with said reaction member.

34. The ratio alternater as in claim 33 wherein said driver and driven member comprise continuously meshed radially non-uniform gears.

35. The ratio alternator as in claim 33 wherein said input member includes an input drive, a crank element driven thereby, and a slotted element rotatable on an axis offset from the axis of said crank element, said crank and slotted elements being substantially continuously drivingly engaged to effect continuously alternating rotation of said slotted element between selected minimum and maximum values, and said slotted element connected to drive said ratio alternater driver element continuously alternatingly between selected minimum and maximum rotational values relative to and cumulative with said slotted element minimum and maximum values.

* * * * *